(12) United States Patent
Chen et al.

(10) Patent No.: US 7,742,258 B2
(45) Date of Patent: Jun. 22, 2010

(54) MAGNETIC TRANSDUCER WITH MILLING MASK

(75) Inventors: Tsung Yuan Chen, San Jose, CA (US); David Patrick Druist, San Jose, CA (US); Quang Le, San Jose, CA (US); Kim Y. Lee, Fremont, CA (US); Chun-Ming Wang, Fremont, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 617 days.

(21) Appl. No.: 11/707,524

(22) Filed: Feb. 12, 2007

(65) Prior Publication Data

US 2007/0139816 A1 Jun. 21, 2007

(51) Int. Cl.
*G11B 5/127* (2006.01)
(52) U.S. Cl. ................................. 360/125.12
(58) Field of Classification Search ............ 360/125.12, 360/125.03, 125.16, 125.13, 125.26, 125.34, 360/125.39
See application file for complete search history.

(56) References Cited

U.S. PATENT DOCUMENTS

| | | | |
|---|---|---|---|
| 5,246,884 A | 9/1993 | Jaso et al. | |
| 6,111,724 A | 8/2000 | Santini | |
| 6,238,582 B1 | 5/2001 | Williams et al. | |
| 6,558,516 B1 | 5/2003 | Kamijima | |
| 6,586,049 B2 | 7/2003 | Uno et al. | |
| 6,604,275 B1 | 8/2003 | Mino et al. | |
| 6,636,460 B2 * | 10/2003 | Akiyama et al. | 369/13.14 |
| 6,664,026 B2 | 12/2003 | Nguyen et al. | |
| 7,441,325 B2 * | 10/2008 | Gao et al. | 29/603.16 |
| 2001/0006436 A1 * | 7/2001 | Akiyama et al. | 360/59 |
| 2002/0017018 A1 | 2/2002 | Ohkawara | |
| 2002/0026704 A1 * | 3/2002 | Stageberg et al. | 29/603.12 |
| 2002/0036873 A1 | 3/2002 | Hara et al. | |
| 2002/0080525 A1 | 6/2002 | Sato et al. | |
| 2003/0137771 A1 | 7/2003 | Santini | |
| 2003/0188422 A1 | 10/2003 | Hashimoto et al. | |
| 2003/0193759 A1 | 10/2003 | Hayashi | |

(Continued)

FOREIGN PATENT DOCUMENTS

JP 2000-173987 B1 6/2000

(Continued)

*Primary Examiner*—Allen T Cao
(74) *Attorney, Agent, or Firm*—G. Marlin Knight

(57) ABSTRACT

A method for fabricating a magnetic head with a trapezoidal shaped pole piece tip is described. The body of the main pole piece is deposited; then one or more layers for the pole piece tip are deposited. A bed material is deposited over the pole piece tip material. A void is formed in the bed material over the area for the pole piece tip. The void is filled with an ion-milling resistant material such as alumina preferably using atomic layer deposition or atomic layer chemical vapor deposition. The excess ion-milling resistant material and the bed material are removed. The result is an ion-milling mask formed over the area for the pole piece tip. Ion milling is then used to remove the unmasked material in the pole piece tip layer and to form a beveled pole piece tip and preferably a beveled face on the main pole piece.

5 Claims, 6 Drawing Sheets

U.S. PATENT DOCUMENTS

| | | |
|---|---|---|
| 2003/0219980 A1 | 11/2003 | Kamijima |
| 2003/0223150 A1 | 12/2003 | Lee |
| 2004/0027730 A1 | 2/2004 | Lille |
| 2004/0032692 A1 | 2/2004 | Kobayashi |
| 2004/0168302 A1 | 9/2004 | Mino |
| 2005/0068665 A1 | 3/2005 | Le et al. |
| 2005/0175864 A1 | 8/2005 | Ikeda et al. |
| 2005/0259355 A1* | 11/2005 | Gao et al. .................... 360/125 |
| 2005/0259356 A1* | 11/2005 | Han et al. .................... 360/126 |
| 2006/0044677 A1* | 3/2006 | Li et al. ...................... 360/122 |
| 2007/0165495 A1* | 7/2007 | Lee et al. ................. 369/13.33 |

FOREIGN PATENT DOCUMENTS

JP 2002-100011 B1 4/2002

* cited by examiner

MAGNETIC TRANSDUCER WITH MILLING MASK

FIELD OF THE INVENTION

The invention relates to the field of magnetic transducers (heads) having inductive write heads and more particularly to the structure of and the process for making the pole pieces for the write head.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. Perpendicular magnetic recording is considered to be superior to longitudinal magnetic recording for ultra-high density magnetic recording. The increase demand for higher areal density has correspondingly led to increase demand to explore ways to reduce the width of the write pole piece, increase the write field strength, and improve the write field gradient.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The area of the main pole piece facing the air-bearing surface is designed to be much smaller than the area of the return pole piece. The shape and size of the main pole and any shields are the primary factors in determining the track width.

FIG. 1 illustrates a prior art disk drive 13 with a head 26 for perpendicular recording and the associated magnetic recording media 27. The conventional. The write head is inductive and includes a coil 45 and pole pieces 41, 42, 43 and 44 with the main pole piece 42 having a pole piece tip 42T. The section taken is perpendicular to the air-bearing surface. FIG. 2 is an illustration of an ABS view of the recording head 26 showing an enlarged view of the pole piece tip 42T as viewed from the air-bearing surface. The read and write elements of the head (also called a slider) are built-up in layers on a wafer using thin film processing techniques to form a large number of heads at the same time. Conventionally after the basic structures for the heads have been formed the individual heads (original) rows of heads) are cut from the wafer to expose what will become the air-bearing surface after further processing. The processing of the air-bearing surface typically includes lapping and formation of air-bearing features typically called rails. The air-bearing features separate the active components of the head such as the pole piece tip 46 from the air-bearing surface which is further separated from the media by an air gap.

In published US patent application 2003/0223150 by Edward Lee a method of protecting the front P2 pole tip during the ion mill patterning of the yoke is described. A front connecting pedestal is electroplated over the front P2 pole tip slightly behind the ABS, and a back gap connecting pedestal is electroplated over the back gap P2 pedestal. Insulator materials are formed over the front P2 pole tip, over the front connecting pedestal, and in between the front and the back gap connecting pedestals. Next, a chemical-mechanical polishing (CMP) is performed over the top of the structure to form a substantially planar top surface. A full-film of yoke layer materials is then sputter deposited over this top surface, followed by the formation of a photoresist mask slightly behind the ABS. When the yoke layer materials are subsequently ion milled to form the yoke, the front P2 pole tip is protected by the surrounding insulator. The front and back gap connecting pedestals form an intervening magnetic layer which connects the front P2 pole tip and back gap P2 pedestal to the yoke.

In published US patent application 20030137771 by Hugo Santini a method of ion milling pole tips in a longitudinal write head is described. Photoresist is spun patterned to form a mask for ion milling to notch the bottom first pole tip layer adjacent first and second side edges of the top first pole tip layer. The use of the ZTH defining layer protects the top surface of the bottom first pole piece layer from thinning due to ion milling except at the notches. It can be seen from the drawings that the ZTH defining layer has set in motion notches for the bottom first pole piece layer without reducing the thickness of the bottom first pole piece layer in first and second field locations outwardly from the notches.

Ion-milling of a pole piece tip for perpendicular heads is advantageous to produce a trapezoidal shape for the pole piece tip. Producing the ion-milling mask is problematic under the current art, since it involves using RIE on an alumina layer. RIE of alumina requires chlorine based chemistry which is expensive and involves inherent safety problems. Polyimide ion-milling masks can also be used, but they are difficult to manufacture with a sufficiently high aspect ratio and the required precision is difficult to achieve. Electroplated ion-milling masks have insufficient milling resistance and dimension control is problematic. A safer and less expensive method of fabricating of pole piece tips is needed.

SUMMARY OF THE INVENTION

Applicant discloses a method for fabricating a pole tip piece on a magnetic transducer. In an embodiment of a process for fabricating a head for perpendicular recording according to the invention, a trapezoidal shape for the pole piece tip is achieved. In an embodiment according to the invention the ferromagnetic material for the body of the main pole piece is deposited, then one or more layers for the pole piece tip are deposited. A bed of hard bake or dielectric material is deposited over the pole piece tip material. Optionally, a planarization stop layer and/or hard mask layer can be deposited onto the bed. A photoresist mask is used to form a trench in the bed material over the area for the pole piece tip. The optional hard mask improves the precision of the trench width since it can withstand the RIE better than the photoresist alone. The trench is overfilled with an ion-milling resistant material such as alumina preferably using atomic layer deposition (ALD) or atomic layer chemical vapor deposition (ALCVD). The excess ion-milling resistant material is removed preferably by planarization or by a wet etch. The optional planarization stop layer aids in determining when the planarization should be stopped. The bed material is removed by an appropriate process such as reactive-ion etching (RIE), ashing or wet etching. The result is an ion-milling mask is formed over the area for the pole piece tip. Ion milling is then used to remove the unmasked material in the pole piece tip layer and to form a beveled pole piece tip and preferably a beveled face on the main pole piece.

DETAILED DESCRIPTION OF THE INVENTION AND THE PREFERRED EMBODIMENTS

It is conventional for thousands of heads to be manufactured simultaneously on a single wafer. For simplicity the following will describe the actions or structures for a single head, but it is to be understood that the process steps are performed over the entire wafer and are, therefore, forming structures for thousands of heads simultaneously. The invention relates to the write head portion of the magnetic transducer and does not place limits on the type of read head that can be used with it. Typically the read head portion of the transducer is fabricated first, but transducers with the write head portion fabricated first have been described in the prior art. A write head according to the invention may be fabricated before or after the read head portion of the transducer.

The relative sizes of the components shown in the figures are not presented according to scale, since the large range of sizes would make the drawings unclear. The relative sizes/thickness of the components are according to prior art principles except where noted below. The hatching lines are not intended to represent the material composition of a structure, but are used only to distinguish structures and aid in the explanation of the process of making the write head.

Figure 1:
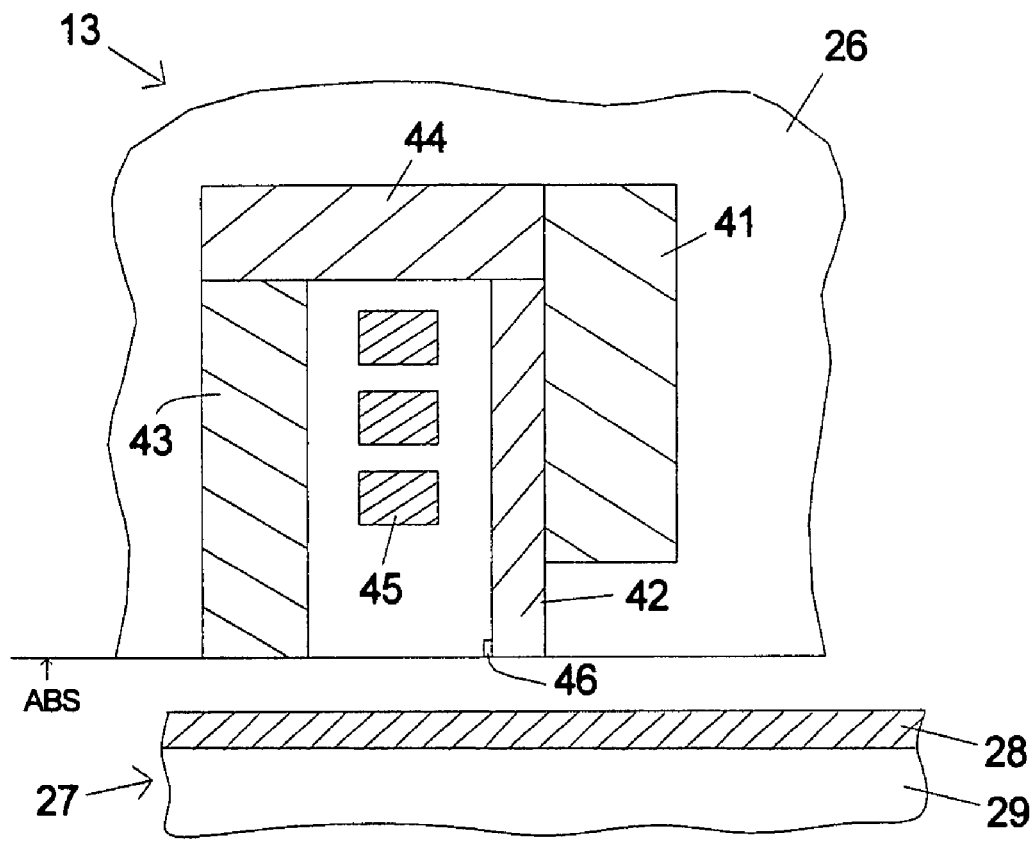
FIG. 1 is an illustration of selected components of a prior art disk drive in which the head fabricated according to the invention can be embodied, as viewed in a section taken perpendicular to the air-bearing surface.
Figure 2:
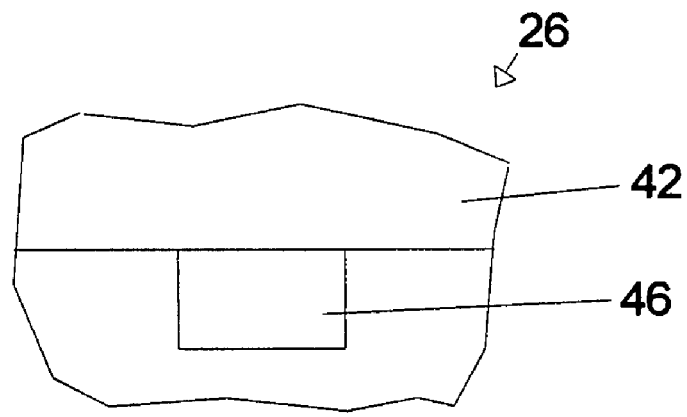
FIG. 2 is an enlarged view of a prior art pole piece tip as viewed from the air-bearing surface.
Figure 3:
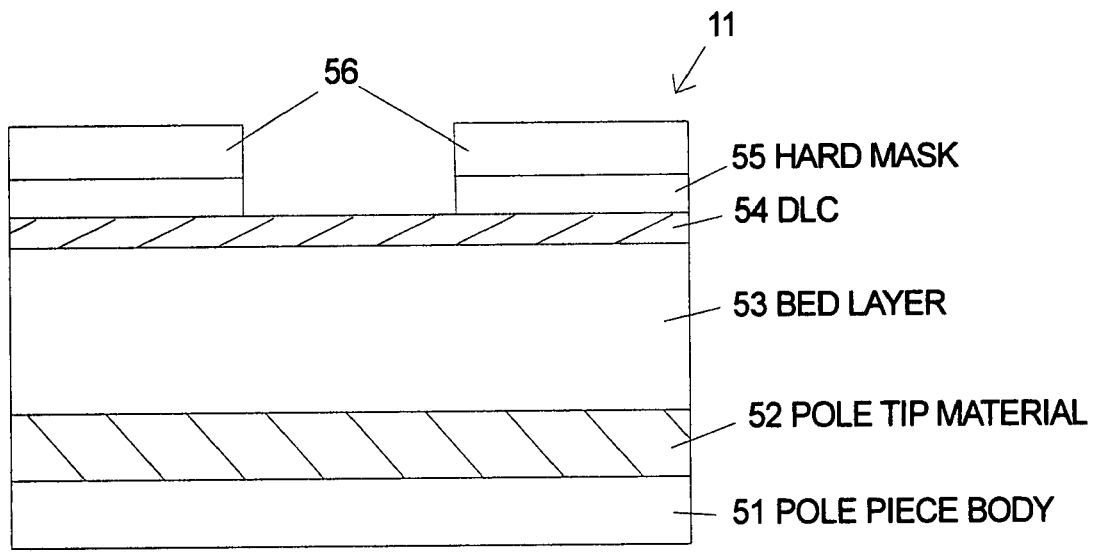
FIG. 3 is a section of a wafer, perpendicular to the thin film surfaces, on which magnetic heads are being fabricated after initial processing according to an embodiment of the invention including patterning a selected area of the hard mask over the pole piece tip layer in preparation for fabricating the pole piece tip.

Reference is made to FIG. 3 to begin the description of a first embodiment of the invention. The section view is perpendicular to the surface of the thin films on wafer 11. The ferromagnetic material for the body of the pole piece 51 has been deposited and patterned according to the prior art. One or more thin layers of ferromagnetic materials are deposited to provide the pole tip material 52 for the pole piece tip according to the prior art. The use of a different material and/or structure for the pole tip is advantageous for reasons outside of the scope of this invention. As one example, a higher moment material can be used. A laminated structure for the pole piece tip is also known in the art. The invention can be used with any type of pole piece tip structure. The thickness of the pole tip material 52 is according to the prior art and is not critical to the method of the invention, but for illustration purposes can be assumed to be on the order of 200 nm. The bed layer 53 is deposited onto the pole tip material 52. The bed layer 53 will be used to form a void in which the ion-milling mask will be formed. The material for the bed layer is selected to allow a selective removal process which will leave the ion-milling mask material intact. The bed layer 53 can be hard bake or a dielectric material. Suitable dielectric materials include SiO2, SiON, SixNy nitrides, and Al2O3. The thickness of the bed layer 53 determines the thickness of final ion milling mask as will be seen. The thickness needed will vary depending on the selected materials, the length of the ion-milling time, etc. and can be determined empirically. A value of one micron is reasonable value. In one embodiment of the invention the photoresist deposition and patterning can begin at this point, but the optional layers useful for CMP endpoint detection and mask resolution will be described. In the embodiment shown in FIG. 3, an optional thin layer of diamond-like carbon (DLC) 54 is deposited to serve as a CMP endpoint detection aid. As is known in the art the DLC detectably slows down the CMP process to provide an indicator of the progress of the planarization and allows the process to stopped at the desired point. Other materials useful for this purpose can be used. The method continues with the deposition of an optional hard mask material 55 such as NiFe. The hard mask improves the precision of the trench width since it can withstand the RIE better than the photoresist alone. The thickness of the hard mask material 55 can be determined empirically. A 30 nm thickness of NiFe is a reasonable value. The photoresist mask 56 is deposited onto the hard mask 55 and processed to form a void in the planar shape of the desired pole piece tip. The first underlying layer in the embodiment shown is the hard mask 55. In an alternative embodiment the bed layer 53 will be the first layer under the photoresist. The hard mask 55 is opened up at this point preferably by ion milling through the photoresist mask 56. For some hard mask materials it can be preferable to open up the trench using RIE. For example, if the bed layer is hard bake, then SiO2 can be used as the hard mask and RIE would be the preferred removal method. The resulting state of the wafer 11 is shown in FIG. 3.

Figure 4:
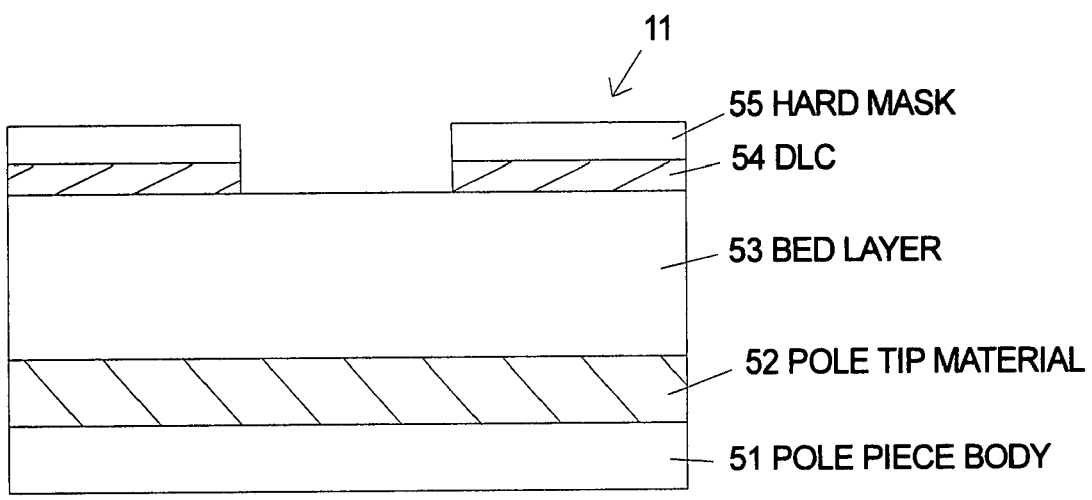
FIG. 4 is a section of a wafer, perpendicular to the thin film surfaces, on which magnetic heads are being fabricated subsequent to FIG. 3 after the photoresist has been stripped and the DLC layer has been patterned exposing the bed material surface according to an embodiment of the invention in preparation for fabricating the pole piece tip.

Reference is made to FIG. 4 to continue the description of the embodiment of the method. Removal of the hard mask 55 leaves the DLC layer 54 exposed in the void. The DLC is preferably removed by a RIE process and then the photoresist 56 is stripped. The result is shown in FIG. 4.

Figure 5:
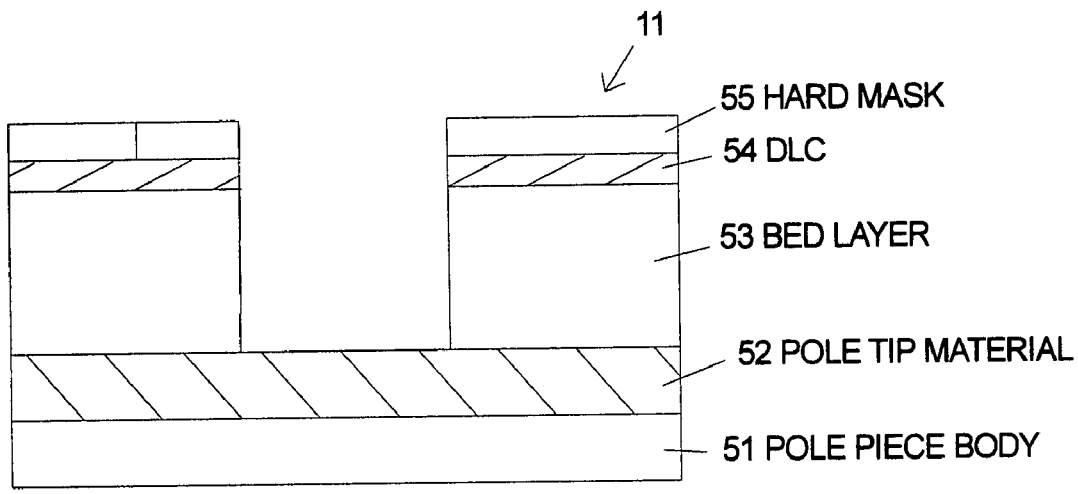
FIG. 5 is a section of a wafer, perpendicular to the thin film surfaces, on which magnetic heads are being fabricated subsequent to FIG. 4 after the bed material has been etched away to form a trench according to an embodiment of the invention in preparation for fabricating the pole piece tip.

The surface of the bed layer 53 is now exposed in the void. The preferred method for removing the bed layer material will depend on the particular material, but for $SiO_2$, RIE is preferred. The result is shown in FIG. 5. The void or trench now extends down to the surface of the pole tip material 52 and the wafer is ready for deposition of the ion-milling mask material.

Figure 6:
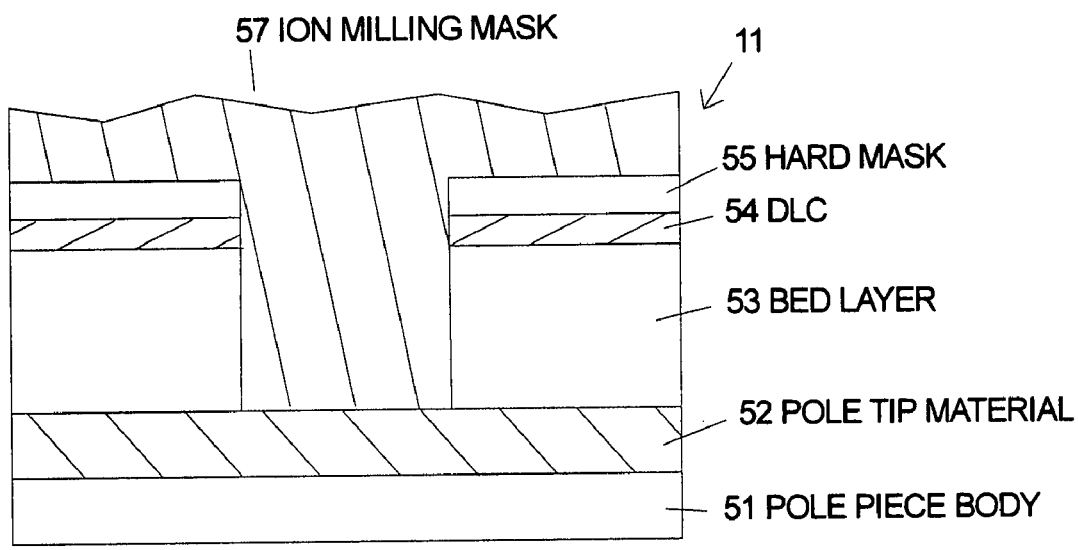
FIG. 6 is a section of a wafer, perpendicular to the thin film surfaces, on which magnetic heads are being fabricated subsequent to FIG. 5 after the ion-milling mask material has been deposited in the trench according to an embodiment of the invention in preparation for fabricating the pole piece tip.
Figure 7A:
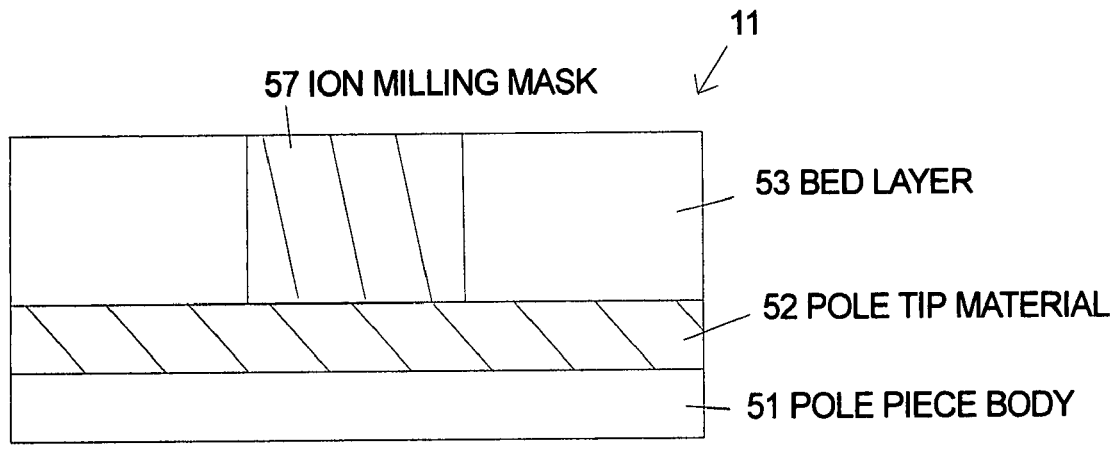
FIG. 7A is a section of a wafer, perpendicular to the thin film surfaces, on which magnetic heads are being fabricated subsequent to FIG. 6 after a planarization process has removed the overfill of the ion-milling mask material and the hard mask material according to an embodiment of the invention in preparation for fabricating the pole piece tip.
Figure 7B:
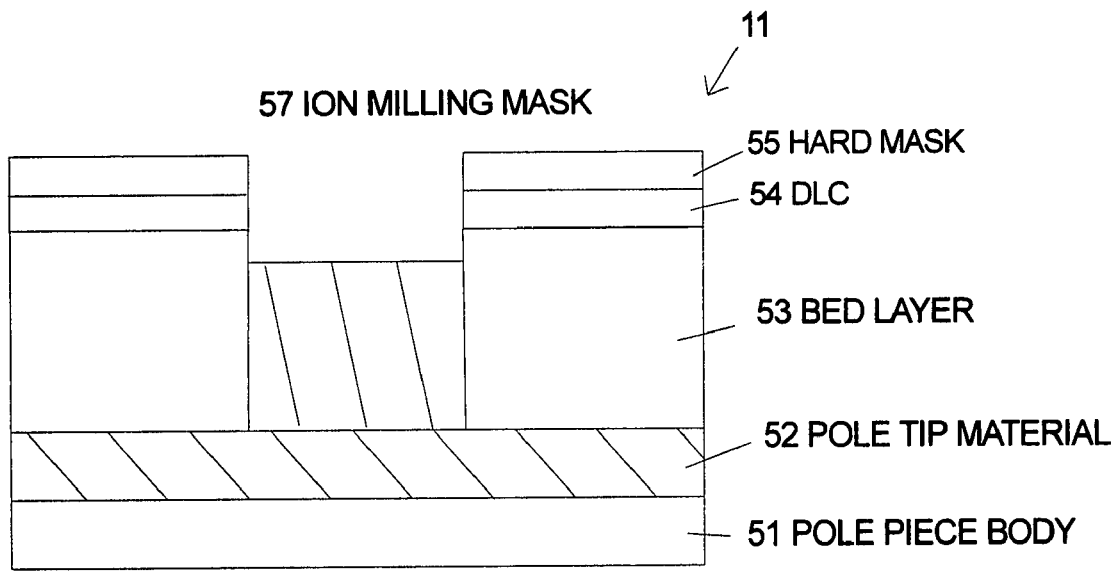
FIG. 7B is a section of a wafer, perpendicular to the thin film surfaces, on which magnetic heads are being fabricated subsequent to FIG. 6 after a wet etch process has removed the overfill of the ion-milling mask material according to an embodiment of the invention in preparation for fabricating the pole piece tip.

The ion-milling mask material is deposited over the wafer to overfill the trench. The result is shown in FIG. 6. The wafer is then processed to remove the excess ion-milling mask material. Optionally a planarization process (CMP) can be to remove the excess material including the hard mask 55 and the DLC 54. The result is shown in FIG. 7A. Alternatively a wet etch process can be to remove the excess material while leaving the hard mask 55. The result is shown in FIG. 7B. The embodiment shown in FIG. 7B does not include the optional DLC layer 54, since CMP is not used. After the excess material has been removed the ion-milling mask 57 has been formed in the trench in the bed layer 53. The material for the ion-milling mask 57 is selected for its ability to resist the ion-milling process. Alumina is preferable, but other resistant materials can be used such as, carbon. The ion-milling mask material can be deposited by any appropriate prior art means, but atomic layer deposition (ALD) or atomic layer chemical vapor deposition (ALCVD) is preferred. The trench which is the form for ion-milling mask should have a high aspect ratio. ALD or ALCVD is preferred for its ability to deposit materials in a deep high aspect ratio trench.

Figure 8:
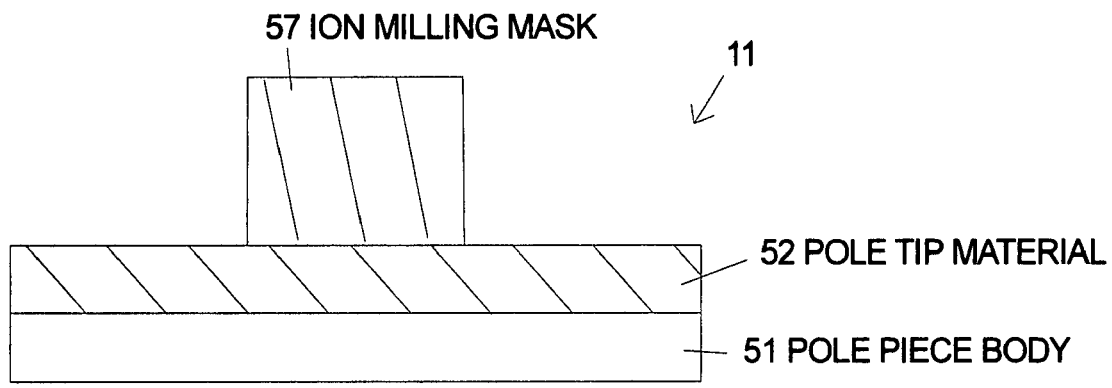
FIG. 8 is a section of a wafer, perpendicular to the thin film surfaces, on which magnetic heads are being fabricated subsequent to FIG. 7 after an etching process has removed the bed material leaving the ion-milling mask according to an embodiment of the invention in preparation for fabricating the pole piece tip.
Figure 9:
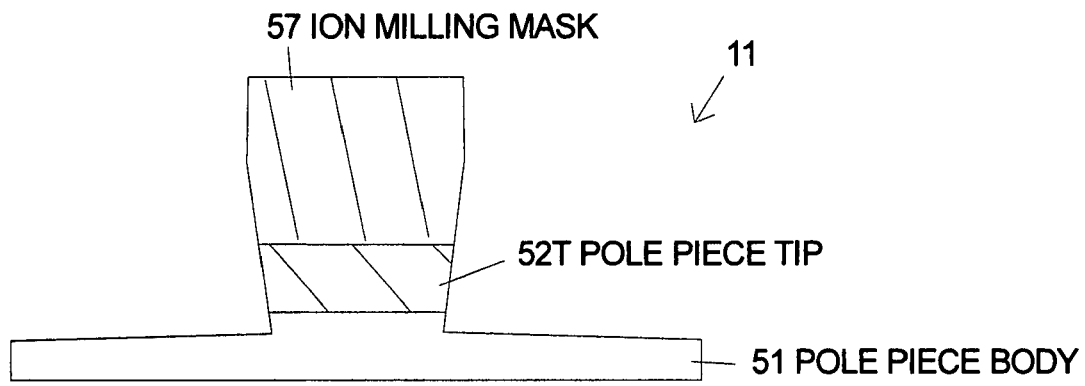
FIG. 9 is a section of a wafer, perpendicular to the thin film surfaces, on which magnetic heads are being fabricated subsequent to FIG. 8 after an ion-milling process has removed the unmasked pole piece tip material leaving the pole piece tip according to an embodiment of the invention.

The bed layer 53 is removed by a process which will leave the ion-milling mask 57 intact. A RIE process is preferred for an $SiO_2$ bed layer 53 and an alumina mask 57. If a hard mask has been included and the wet etch option has been used, the hard mask 55 can still be present on the bed 53. A suitable RIE, ash or wet etch process can be selected to remove both the hard mask 55 and the bed layer 53. The result is shown in FIG. 8. The wafer is now ready to use ion-milling to shape the pole piece tip. Ion-milling will remove all of the pole tip material 52 not protected by the ion-milling mask 57 as shown in FIG. 9. The sides of the pole piece tip 52T will be beveled inward since the ion-milling will remove material farther away from the ion-milling mask at a slightly higher rate. This inward beveling is desirable. The ion-milling should preferably by continued to remove some of the underlying pole body 51 to ensure complete removal of the unwanted pole tip material and to enhance the shape of the pole body by forming a slight bevel sloping away from the pole piece tip 52T. The ion-milling process can be monitored using SEM imaging or by sampling using FIB cross-sectioning and then adjusted to improve the process.

For heads which are sawed and lapped after the ion-milling is complete, the ion-milling mask 57 does not to be removed. The area where the ion-milling mask 57 resides will be in the write gap which is typically a non-magnetic material such as alumina and, therefore, the alumina or similar material used for the mask will simply become part of the gap. The ion-milling mask 57 can also be removed after ion-milling so that it does not appear in the final head. After the ion-milling according to the invention the process of fabricating the head continues according to the prior art.

Figure 10:
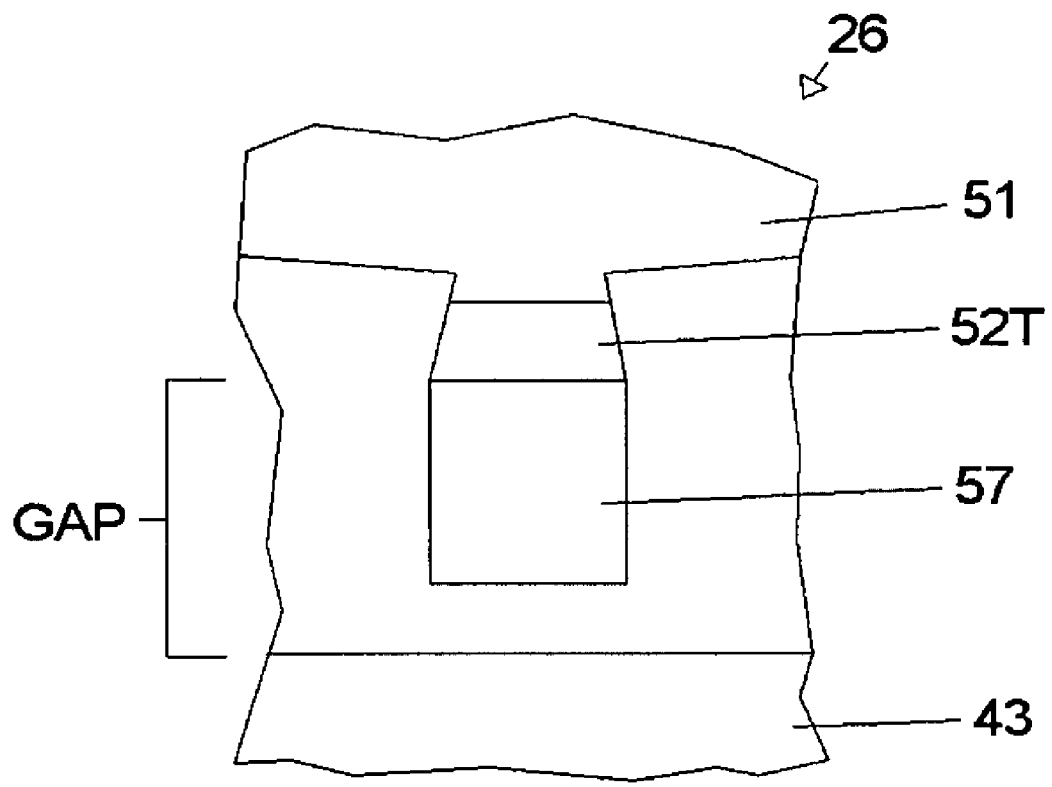
FIG. 10 is an enlarged view of a beveled pole piece tip according to the invention as viewed from the air-bearing surface.

The method of the invention can be used with head designs that require sawing and lapping as is the case for the head illustrated in FIG. 10. In this case after the ion-milling of the pole tip, the rest of the write head including the gap, coil and return pole piece 43 are completed and the saw cut is made along the plane of the air-bearing surface which is perpendicular to the thin film surface. A view of the 52T as viewed from the air-bearing surface is illustrated in FIG. 10. In the embodiment shown the ion-milling mask 57 has been left in place and resides in the write gap as described above. The ion-milling mask 57 can be the same material as used for the gap, for example, alumina, so the ion-milling mask 57 can blend in with the other material in the gap.

Other variations and embodiments according to the invention will be apparent to those skilled in the art which will nevertheless be with the spirit and scope of the invention.

What is claimed is:

1. A magnetic head comprising:
    a return pole piece;
    a main pole piece;
    a pole piece tip connected to the main pole piece and extending toward the return pole piece in a write gap, the pole piece tip having sides that slope inward as viewed from an air-bearing surface and being narrower at a connecting surface with the main pole piece; and
    an ion-milling mask for the pole piece tip in the write gap between the return pole piece and the pole piece tip, a shape of the ion-milling mask as viewed in a first plane perpendicular to the air-bearing surface being coincident with a shape of the pole piece tip as viewed in the first plane perpendicular to the air-bearing surface.

2. A magnetic head comprising:
    a return pole piece;
    a main pole piece;
    a pole piece tip connected to the main pole piece and extending toward the return pole piece in a write gap, the pole piece tip having sides that slope inward as viewed from an air-bearing surface and being narrower at a connecting surface with the main pole piece; and
    an ion-milling mask for the pole piece tip in the write gap between the return pole piece and the pole piece tip; and
    wherein the main pole piece is beveled to slope away from the pole piece tip.

3. The magnetic head of claim 1 wherein the ion-milling mask is alumina.

4. The magnetic head of claim 1 wherein the ion-milling mask is carbon.

5. A magnetic head comprising:
    a return pole piece;
    a main pole piece;
    a pole piece tip connected to the main pole piece and extending toward the return pole piece in a write gap, the pole piece tip having sides that slope inward as viewed from an air-bearing surface and being narrower at a connecting surface with the main pole piece; and
    an ion-milling mask for the pole piece tip in the write gap between the return pole piece and the pole piece tip; and
    wherein the pole piece tip has a trapezoidal shape as viewed from the air-bearing surface.

* * * * *